(12) United States Patent
Welch et al.

(10) Patent No.: US 10,059,092 B2
(45) Date of Patent: Aug. 28, 2018

(54) ADDITIVE MANUFACTURING OF FUNCTIONALLY GRADIENT DEGRADABLE TOOLS

(71) Applicants: John C. Welch, Spring, TX (US); Zhiyue Xu, Cypress, TX (US); James Andy Oxford, Magnolia, TX (US)

(72) Inventors: John C. Welch, Spring, TX (US); Zhiyue Xu, Cypress, TX (US); James Andy Oxford, Magnolia, TX (US)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 221 days.

(21) Appl. No.: 14/853,977

(22) Filed: Sep. 14, 2015

(65) Prior Publication Data

US 2017/0072471 A1  Mar. 16, 2017

(51) Int. Cl.
| | |
|---|---|
| B33Y 10/00 | (2015.01) |
| B33Y 80/00 | (2015.01) |
| B22F 3/105 | (2006.01) |
| B22F 1/02 | (2006.01) |

(52) U.S. Cl.
CPC ............... B33Y 80/00 (2014.12); B22F 1/02 (2013.01); B22F 1/025 (2013.01); B22F 3/1055 (2013.01); B33Y 10/00 (2014.12); B22F 2207/01 (2013.01); B22F 2207/13 (2013.01); B22F 2998/00 (2013.01); Y02P 10/295 (2015.11)

(58) Field of Classification Search
CPC ....... B33Y 80/00; B33Y 10/00; B22F 3/1055; B22F 1/02; B22F 1/025
See application file for complete search history.

(56) References Cited

U.S. PATENT DOCUMENTS

| | | | |
|---|---|---|---|
| 5,182,170 A | 1/1993 | Marcus et al. | |
| 6,429,402 B1 | 8/2002 | Dixon et al. | |
| 6,454,811 B1 | 9/2002 | Sherwood et al. | |
| 6,476,343 B2 | 11/2002 | Keicher et al. | |
| 6,656,410 B2 | 12/2003 | Hull et al. | |
| 6,676,892 B2 | 1/2004 | Das et al. | |
| 6,680,456 B2 | 1/2004 | Adams | |
| 6,694,207 B2 | 2/2004 | Darrah et al. | |
| 6,811,744 B2 | 11/2004 | Keicher et al. | |
| 6,861,612 B2 | 3/2005 | Bolton et al. | |
| 7,765,022 B2 | 7/2010 | Mazumder et al. | |
| 8,718,522 B2 | 5/2014 | Chillscyzn et al. | |
| 8,826,938 B2 | 9/2014 | Moore | |
| 8,828,311 B2 | 9/2014 | Medina et al. | |
| 2002/0093115 A1 | 7/2002 | Jang et al. | |
| 2003/0094730 A1 | 5/2003 | Dourfaye et al. | |
| 2006/0045787 A1 | 3/2006 | Jandeska et al. | |
| 2008/0124423 A1 | 5/2008 | Peterson et al. | |
| 2010/0038807 A1 | 2/2010 | Brodkin et al. | |
| 2010/0279147 A1* | 11/2010 | Kusinski | C23C 4/08 428/678 |
| 2011/0135953 A1 | 6/2011 | Xu et al. | |
| 2011/0190904 A1* | 8/2011 | Lechmann | A61B 17/7208 623/23.61 |
| 2012/0193148 A1 | 8/2012 | Overstreet et al. | |
| 2012/0273229 A1 | 11/2012 | Xu et al. | |
| 2013/0310961 A1 | 11/2013 | Intriago Velez | |
| 2013/0320598 A1 | 12/2013 | Atkins et al. | |
| 2014/0035205 A1 | 2/2014 | Hagiwara et al. | |
| 2014/0076154 A1 | 3/2014 | Frick et al. | |
| 2014/0116711 A1 | 5/2014 | Tang | |
| 2014/0163717 A1 | 6/2014 | Das et al. | |
| 2014/0255198 A1 | 9/2014 | El-Wardany et al. | |
| 2014/0302188 A1 | 10/2014 | Rix et al. | |
| 2014/0305529 A1 | 10/2014 | Kroll et al. | |
| 2015/0024233 A1* | 1/2015 | Gunther | G05B 19/41875 428/601 |

FOREIGN PATENT DOCUMENTS

| | | |
|---|---|---|
| EP | 0762922 | 3/1997 |
| GB | 2486046 A | 6/2012 |
| WO | 2012071449 A2 | 5/2012 |
| WO | 2013087515 A1 | 6/2013 |
| WO | 2014083277 A1 | 6/2014 |
| WO | 2014154748 A1 | 10/2014 |

OTHER PUBLICATIONS

"Additive Manufacturing of Downhole Tools with Desired Degree of Anisotropy at Different Locations in the Same Tool", IP.com No. IPCOM000241230D, Apr. 7, 2015; 2 pages.
Hascoet, et al. "Manufacturing of Complex Parts With Continuous Functionally Graded Materials (FGM)", Cedex, FR, Aug. 17, 2011; 13 pages.
International Search Report and Written Opinion, International Application No. PCT/US2016/046307, dated Nov. 16, 2016, Korean Intellectual Property Office; International Search Report 3 pages, Written Opinion 10 pages.
International Search Report and Written Opinion, International Application No. PCT/US2016/051635, dated Dec. 27, 2016, Korean Intellectual Property Office; International Search Report 4 pages, Written Opinion 9 pages.

* cited by examiner

Primary Examiner — Margaret G Moore
(74) Attorney, Agent, or Firm — Cantor Colburn LLP

(57) ABSTRACT

A method of manufacturing an article comprises depositing a metallic powder on a substrate or a worktable; fusing the metallic powder according to a preset pattern; and adjusting a composition of the metallic powder or a condition to fuse the metallic powder or a combination thereof to additively form an article such that the article has a first portion and a second portion, wherein the first portion has one or more of the following properties different than those of the second portion: corrosion rate; tensile strength; compressive strength; modulus; or hardness.

19 Claims, 6 Drawing Sheets

ADDITIVE MANUFACTURING OF FUNCTIONALLY GRADIENT DEGRADABLE TOOLS

BACKGROUND

Oil and natural gas, or carbon dioxide sequestration wells often utilize wellbore components or tools that, due to their function, are only required to have limited service lives that are considerably less than the service life of the well. After a component or tool service function is complete, it must be removed or disposed of in order to recover the original size of the fluid pathway for use, including hydrocarbon production, $CO_2$ sequestration, etc.

To facilitate removal, such tools or components may be formed of a corrodible material so that they need not be physically removed by, for example, a mechanical operation, but may instead corrode or dissolve under downhole conditions. These tools may be formed by molding, forging, extrusion, roll forming, or other methods that can heat and compress the material. Machining may be necessary in order to provide an article having the desired shape and dimensions.

Despite all the advances, it is still challenging to form corrodible articles having complex structures. In certain circumstances, to manufacturing an article having different corrosion rates, it may be necessary to produce separate components and then joining the components together to form the article. Thus, the art is receptive to alternative methods of manufacturing corrodible tools, in particular methods capable of making a corrodible tool having gradient properties. It would be a further advantage if such an article can be made in one piece without the need to join different components together.

BRIEF DESCRIPTION

A method of manufacturing an article comprises depositing a metallic powder on a substrate or a worktable; fusing the metallic powder according to a preset pattern; and adjusting a composition of the metallic powder or a condition to fuse the metallic powder or a combination thereof to additively form an article such that the article has a first portion and a second portion, wherein the first portion has one or more of the following properties different than those of the second portion: corrosion rate; tensile strength; compressive strength; modulus; or hardness.

A method of using an article comprises forming an article according to a method disclosed herein, the article comprising a first portion that is corrodible in a fluid at a first corrosion rate and a second portion that is corrodible in the fluid at a second corrosion rate, wherein the first corrosion rate is greater than the second corrosion rate; using the article to perform a first operation; exposing the article to the fluid; selectively corroding the first portion of the article to provide a corroded article; and using the corroded article to perform a second operation that is different from the first operation.

Also disclosed is an article comprising a plurality of micro-sized or nano-sized galvanic cells, wherein the article has a seamless structure encompassing an empty space.

A method of manufacturing the article having the seamless structure comprises depositing a metallic powder on a substrate or a worktable; and fusing the metallic powder according to a preset pattern to additively form the article.

BRIEF DESCRIPTION OF THE DRAWINGS

Referring now to the drawings wherein like elements are numbered alike in the several Figures.

DETAILED DESCRIPTION

Disclosed herein are additive manufacturing methods capable of producing articles having a gradient corrosion rate, a gradient hardness, a gradient tensile strength, a gradient compressive strength, a gradient compressive modulus, or a combination thereof. Without being bound by theory, it is believed that the favorable results obtained herein can be achieved through carefully selecting the material and/or the process conditions to make the articles.

The material to manufacture the articles is a metallic powder comprising a coated or uncoated matrix particle, wherein the coated matrix particle has a particle core with a nanoscale coating disposed thereon. When the metallic powder comprises an uncoated matrix particle, the metallic powder further comprises a second particle. When the metallic powder comprises a coated matrix particle, the second particle is optional.

During the process to make the articles, the metallic powder is fused using an energy beam from a laser or other energy sources. The degree of homogenization can be controlled by the energy to fuse the metallic powder, which in turn is controlled by the intensity of the energy beam applied to the metallic powder, the speed of the energy beam to scan the metallic powder, or a combination thereof. Homogenization differences lead to variations in the physical and chemical properties of the produced articles. Accordingly, by adjusting the energy to fuse the metallic powder according to a preset pattern, an article having at least two portions, each having a different physical and/or chemical property can be made.

Alternatively or in addition, by adjusting the weight ratio of the coated or uncoated matrix particle relative to the second particle according to a preset pattern or by adjusting the particle size of the coated or uncoated matrix particle, and/or the particle size of the second particle, parts with gradient physical or chemical properties can be manufactured.

In some embodiments of the methods, a plurality of layers is formed by an additive manufacturing process. "Plurality" as used in the context of additive manufacturing includes 20 or more layers. The maximum number of layers can vary greatly, determined, for example, by considerations such as the size of the article being manufactured, the technique used, the capabilities of the equipment used, and the level of detail desired in the final article. For example, 20 to 100,000 layers can be formed, or 50 to 50,000 layers can be formed.

As used herein, "layer" is a term of convenience that includes any shape, regular or irregular, having at least a predetermined thickness. In some embodiments, the size and configuration of two dimensions are predetermined, and on some embodiments, the size and shape of all three dimensions of the layer is predetermined. The thickness of each layer can vary widely depending on the additive manufacturing method. In some embodiments the thickness of each layer as formed differs from a previous or subsequent layer. In some embodiments, the thickness of each layer is the same. In some embodiments the thickness of each layer as formed is about 0.1 millimeters (mm) to about 10 mm or about 0.5 mm to about 5 mm.

The term additive manufacturing as used herein involves depositing or building a part or article layer-by-layer. In some embodiments, this can occur by depositing as a sequence of layers on a substrate or a worktable, in an x-y plane. These deposited layers are fused together using an energy beam from an energy source. The position of a powder supply device relative to the platform or substrate is then moved along a z-axis (perpendicular to the x-y plane), and the process is then repeated to form a 3D article resembling a digital representation of the article. Alternatively, the substrate or worktable is configured to move in an x-y plane and the powder supply device is configured to move along a z-axis.

Any additive manufacturing process can be used herein, provided that the process allows the depositing of at least one layer of a metallic material upon a substrate or worktable, fusing the metallic powder to form a fused layer, and repeating these operations until an article is made.

Figure 5:
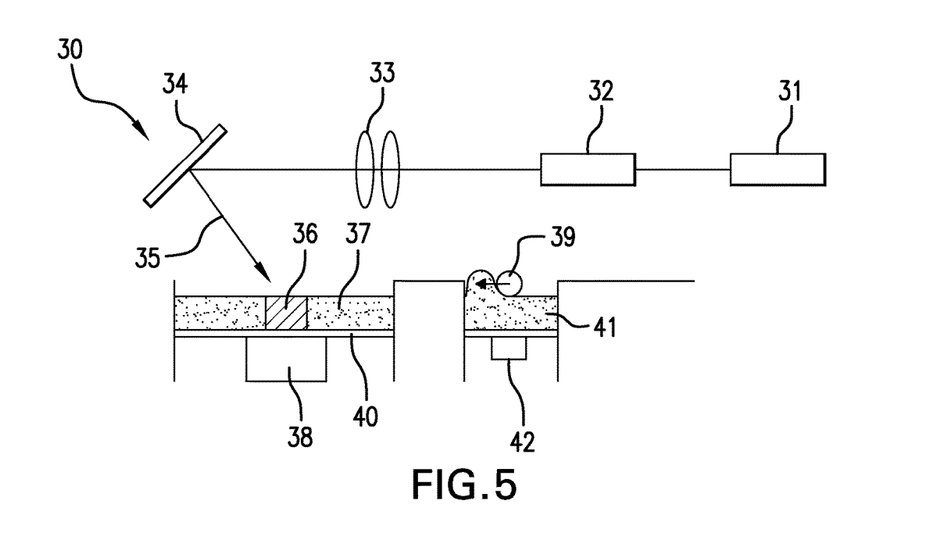
FIG. 5 depicts an embodiment of a manufacturing system or apparatus for manufacturing an article.

Systems for additive manufacturing are known. An exemplary system for performing an additive process to manufacture articles having gradient properties is shown in FIG. 5. A manufacturing system 30 for performing a manufacturing process includes a processing device 31 (e.g., a desktop or laptop computer) connected to an energy source such as laser 32. The processing device includes suitable software to control the laser 32 based on an inputted design. The design may be created by a user using software, such as a computer aided design (CAD) program, stored in the processing device 31, or the design may be input from a different device.

The processing device 31 directs the laser to emit a beam 35, and steers or otherwise controls the beam using, e.g., lenses 33 and a scanning mirror 34. The beam 35 is applied to a metallic powder 37 disposed on a building platform or worktable 40 to successively form layers that build an article 36. A powder supply device 41 may be utilized to supply powder to the building platform through a roller 39. Although not shown, it is appreciated that more than one powder supply device can be present. At least one of the building platform and the powder supply device is configured to move along a direction perpendicular to the platform or powder supply device by guide rails 38 and 42. Other similar arrangements can also be used such that one or both of the platform and powder supply device are moveable relative to each other. The build platform can be isolated or exposed to atmospheric conditions.

Figure 6:
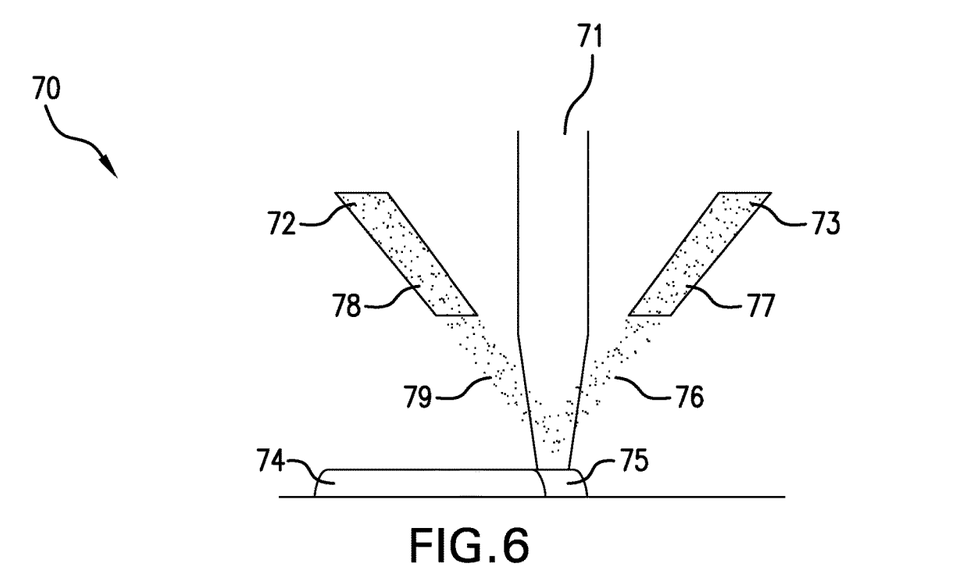
FIG. 6 depicts another embodiment of a manufacturing system or apparatus for manufacturing an article.

Another exemplary system for performing an additive process to manufacture articles having gradient properties is shown in FIG. 6. As shown in FIG. 6, a manufacturing system 70 for performing an additive manufacturing process includes two dispersers 72 and 73, which supply powders 77 and 78 as powder streams 76 and 79. The deposited layer 74, when heated by laser beam 71 forms a melt pool 75, into which powders 77 and 78 are fed.

One embodiment of a method of manufacturing an article such as a downhole article comprises depositing a metallic powder on a substrate or a worktable; and fusing the metallic powder according to a preset pattern to additively form the article. To manufacture an article having gradient properties, the method further comprises adjusting a composition of the metallic powder or a condition to fuse the metallic powder or a combination thereof.

The metallic powder comprises a coated or uncoated metallic matrix particle. When the metallic powder comprises an uncoated matrix particle, the metallic powder further comprises a second particle. When the metallic powder comprises a coated matrix particle, the second particle is optional.

Figure 1:
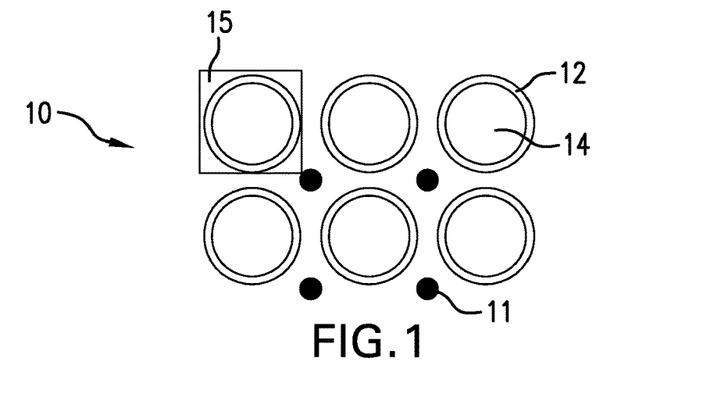
FIG. 1 is a schematic illustration of an exemplary embodiment of a metallic powder used to make an article.

The coated metallic matrix particles of the powder include a particle core and a nanoscale metallic coating layer disposed on the particle core. As shown in FIG. 1 an exemplary metallic powder 10 contains a coated metallic particle 15 and a second particle 11, wherein the coated particle 15 has a core 14 and a nanoscale coating 12 disposed on the core. Suitable core materials include electrochemically active metals having a standard oxidation potential greater than or equal to that of Zn, including at least one of the following: Mg; Al; Mn; or Zn. These electrochemically active metals are very reactive with a number of common wellbore fluids, including any number of ionic fluids or highly polar fluids, such as those that contain various chlorides. Core material may also include other metals that are less electrochemically active than Zn or non-metallic materials, or a combination thereof. Suitable non-metallic materials include ceramics, composites, glasses or carbon, or a combination thereof.

With regard to the electrochemically active metals as core materials, including Mg, Al, Mn or Zn, these metals may be used as pure metals or in any combination with one another, including various alloy combinations of these materials, including binary, tertiary, or quaternary alloys of these materials. These combinations may also include composites of these materials. Further, in addition to combinations with one another, the Mg, Al, Mn or Zn core materials may also include other constituents, including various alloying additions, to alter one or more properties of the particle cores, such as by improving the strength, lowering the density or altering the corrosion characteristics of the core material.

Among the electrochemically active metals, Mg, either as a pure metal or an alloy or a composite material, is particularly useful, because of its low density and ability to form high-strength alloys, as well as its high degree of electrochemical activity, since it has a standard oxidation potential higher than Al, Mn or Zn. Mg alloys include all alloys that have Mg as an alloy constituent. Mg alloys that combine other electrochemically active metals, as described herein, as alloy constituents are particularly useful, including binary Mg—Zn, Mg—Al and Mg—Mn alloys, as well as tertiary Mg—Zn—Y and Mg—Al—X alloys, where X includes Zn, Mn, Si, Ca or Y, or a combination thereof. These Mg—Al—X alloys may include, by weight, up to about 85% Mg, up to about 15% Al and up to about 5% X. Particle core including Mg, Al, Mn or Zn, or combinations thereof, may also include a rare earth element or combination of rare earth elements. As used herein, rare earth elements include Sc, Y, La, Ce, Pr, Nd or Er, or a combination of rare earth elements. Where present, a rare earth element or combinations of rare earth elements may be present, by weight, in an amount of about 5% or less.

In an exemplary embodiment, the particle cores may have an average particle diameter of about 5 µm to about 300 µm, more particularly about 80 µm to about 120 µm, and even more particularly about 100 µm.

Metallic coating is a nanoscale coating layer. In an exemplary embodiment, metallic coating may have a thickness of about 25 nm to about 2500 nm. Metallic coating may include a single layer or a plurality of layers as a multilayer coating structure for up to four layers. In a single layer coating, or in each of the layers of a multilayer coating, the metallic coating layer may include a single constituent chemical element or compound, or may include a plurality of chemical elements or compounds.

Metallic coating material includes one or more of the following: Al; Zn; Mn; Mg; Mo; W; Cu; Fe; Si; Ca; Co; Ta; Re; or Ni; or an oxide; nitride or a carbide thereof. In an embodiment, metallic coating comprises one or more of the following: aluminum oxide; Al—Cu alloy; Al—Mn alloy; Al—Si alloy; Al—Mg alloy; Al—Mg—Si alloy; Al—Zn alloy; Al—Li alloy; Al—Cu—Mg—X alloy; or Al—Zn—Mg—Cu—X; and X is one or more of the following: Zn; Mn; Si; Cr; Fe; Ni; Ti; V; Cu; Pb; Bi; or Zr.

In yet another exemplary embodiment, the coating includes two layers. The first layer is disposed on the surface of particle core and includes Al or Ni, or a combination thereof, the second layer is disposed on the surface of the first layer and includes Al, Zn, Mg, Mo, W, Cu, Fe, Si, Ca, Co, Ta, Re or Ni, or a combination thereof, and the first layer has a chemical composition that is different than the chemical composition of the second layer. Exemplary embodiments of a two-layer metallic coating layers for use on particles cores comprising Mg include first/second layer combinations comprising Al/Ni and Al/W.

In still another embodiment, the coating layer includes three layers. The first layer is disposed on particle core and may include Al or Ni, or a combination thereof. The second layer is disposed on first layer and may include Al, Zn, Mg, Mo, W, Cu, Fe, Si, Ca, Co, Ta, Re or Ni, or an oxide, nitride or a carbide thereof, or a combination of any of the aforementioned second layer materials. The third layer is disposed on the second layer and may include Al, Mn, Fe, Co, Ni or a combination thereof. In a three-layer configuration, the composition of adjacent layers is different. An exemplary embodiment of a three-layer coating layer for use on particles cores comprising Mg include first/second/third layer combinations comprising Al/Al$_2$O$_3$/Al.

In still another embodiment, the coating includes four layers, wherein the first layer disposed on the core may include Al or Ni, or a combination thereof, the second layer disposed on the first layer and the third layer disposed on the second layer may independently include one or more of Al; Zn; Mg; Mo; W; Cu; Fe; Si; Ca; Co; Ta; Re; or Ni or an oxide; nitride; carbide thereof; and the fourth layer disposed on the third layer may include Al, Mn, Fe, Co, Ni or a combination thereof. In the four-layer configuration, the chemical composition of adjacent layers is different.

In an embodiment, the materials for the nanoscale coating and the core are selected such that the coating has a melting point lower than that of the particle core. As used herein, melting point refers to the lowest temperature at which incipient melting or liquation or other forms of partial melting occur within core material or the coating material, regardless of whether the core or the coating comprises a pure metal, an alloy with multiple phases having different melting temperatures or a composite of materials having different melting temperatures. The difference in the melting point between the core and the coating allows the coating to be selectively melted or softened during the manufacturing while leaving the core intact.

In another embodiment, the core is partially or completely melted during the manufacturing process. The coating, which is not melted, partially melted, or completely melted, can then be integrated into the melted core material, or can remain as a three dimensional framework supported by the core material when it solidifies.

The uncoated metallic matrix particle comprises one or more of the following: a magnesium-based alloy; an aluminum-based alloy; or a zinc-based alloy. As used herein, the term "metal-based alloy" means a metal alloy wherein the weight percentage of the specified metal in the alloy is greater than the weight percentage of any other component of the alloy, based on the total weight of the alloy.

Magnesium-based alloys suitable for use include alloys of magnesium with aluminum (Al), cadmium (Cd), calcium (Ca), cobalt (Co), copper (Cu), iron (Fe), manganese (Mn), nickel (Ni), silicon (Si), silver (Ag), strontium (Sr), thorium (Th), tungsten (W), zinc (Zn), zirconium (Zr), or a combination comprising at least one of these elements. Alloying or trace elements can be included in varying amounts to adjust the corrosion rate of the magnesium. Exemplary commercial magnesium-based alloys which include different combinations of the above alloying elements to achieve different degrees of corrosion resistance include but are not limited to, for example, those alloyed with aluminum, strontium, and manganese such as AJ62, AJ50x, AJ51x, and AJ52x alloys, and those alloyed with aluminum, zinc, and manganese such as AZ91A-E alloys. Other exemplary magnesium-based alloys include MgZrZn, MgAlZn, AlCuZnMn, and AlMgZnSiMn.

Aluminum-based alloys include all alloys that have aluminum as an alloy constituent. Exemplary aluminum alloys include Al—Cu alloy, Al—Mn alloy, Al—Si alloy, Al—Mg alloy, Al—Mg—Si alloy, Al—Zn alloy, Al—Li alloy, Al—Cu—Mg—X alloy, Al—Zn—Mg—Cu—X, where X represents alloying elements including Zn, Mn, Si, Cr, Fe, Ni, Ti, V, Cu, Pb, Bi, and Zr.

Zinc-based alloys include alloys of zinc with Al, Cu, Mg, Pb, Cd, Sn, Fe, Ni, Si, or a combination of the above elements. In a specific embodiment, the metallic matrix material is a magnesium alloy.

The uncoated matrix particles have an initial average particle size from about 0.1 µm to about 500 µm, in an embodiment 0.5 µm to about 250 µm. The shape of the matrix particles may be regular or irregular. In an embodiment, the matrix particles may be, for example, spherical or oblong.

Figure 2:
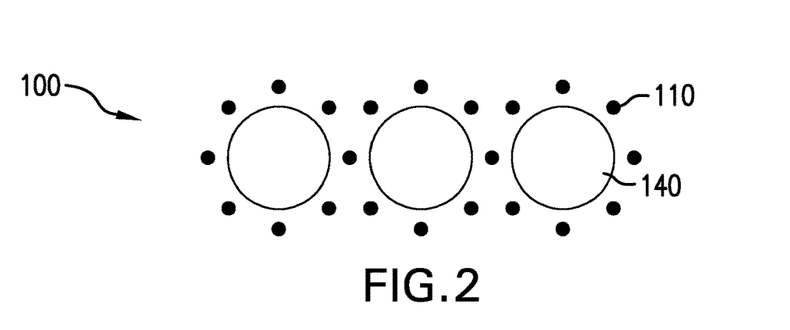
FIG. 2 is a schematic illustration of another exemplary embodiment of a metallic powder used to make an article.

A metallic powder containing uncoated metallic matrix particles is shown in FIG. 2. As shown in FIG. 2, metallic powder 100 contains a plurality of uncoated matrix particles 140 and a plurality of second particles 110.

The second particle may be selected to change a physical, chemical, mechanical or other property of the article formed from metallic powder. In an exemplary embodiment, the property change may include an increase in the compressive strength or a change of the corrosion rate of the article or a change of the hardness, compressive modulus, or tensile strength of the article. Second powder particles include one or more of the following: Ni; W; Cu; Co; or Fe; oxides; nitrides, or carbides thereof.

When used together with the uncoated metallic matrix particles, the second particles have a size that is at least about ten times smaller, at least about five times smaller, or at least about 2 times smaller than that of the uncoated metallic matrix particles.

The amount of the secondary particles can vary depending on the specific materials used and the desired properties such as desired corrosion rate. In an embodiment, the metallic powder comprises 0.01 to 10 wt. %, or 0.05 to 8 wt. %, or 0.1 to 6 wt. % of the secondary particles, based on the total weight of the metallic powder. In another embodiment, the weight ratio of the coated or uncoated metallic matrix particle relative to the second particle is about 99:1 to about 9:1 in the metallic powder.

The metallic powder can be made by mixing the components before the additive manufacturing process starts. Alternatively, the metallic powder can be made in situ during the additive manufacturing process, for example, using multiple nozzles or dispensers.

A system (e.g., the system of FIG. 5 or the system of FIG. 6) can be used to additively form the article from the metallic powder by using an energy beam to heat the metallic powder and form successive layers. Each layer is formed on the immediately preceding layer until the structure is complete.

A metallic powder containing the coated or uncoated metallic matrix particles can be deposited on a worktable or a surface of a substrate. In an embodiment, the layers are deposited using a "powder bed" method, in which a layer or "bed" of powder is laid on a worktable or a surface of a substrate. For example, a powder supply device 41 may be utilized to supply powder to the building platform through a roller 39. Then an energy beam such as a laser beam is applied to portions of the bed of powder to fuse the powder together into the desired shape of the layer. One such method is called selective laser sintering method. Laser melting or selective laser melting methods can also be used.

In another embodiment, the method includes supplying the metallic powder to a surface as the laser or other beam source is applied and moved over the surface/structure. An example of such a method is referred to as laser engineered net shaping (LENS), which includes supplying metal powder coaxially with a laser beam, and moving the beam (and/or surface or table) two-dimensionally along with the powder supply as each layer is formed. Such a method can also be referred to as direct metal deposition or laser metal deposition or direct laser deposition.

During fusing process, an energy beam such as an electromagnetic beam from an energy source such as a laser is applied to the metallic powder to fuse the powder. The metallic powder is at least partially fused before deposited on the substrate or the worktable. Alternatively, the metallic powder is fused after deposited on the substrate or the worktable.

Figure 3:
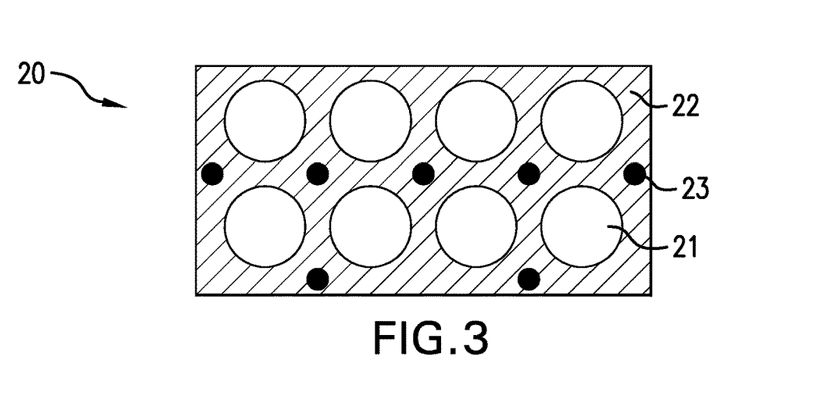
FIG. 3 is a schematic illustration of an exemplary embodiment of the microstructure of a portion of an article.

In an embodiment, a laser is applied to the metallic powder to selectively melt or soften the coatings of the particles but not the particle cores such that the coating forms a substantially continuous cellular nanomatrix and the particle core forms discrete particles distributed in the cellular nanomatrix. FIG. 3 is a schematic illustration of an exemplary embodiment of the microstructure of a portion of the article. As shown in FIG. 3, the article 20 contains discrete particles 21 formed from the core of the coated particles and a substantially continuous cellular nanomatrix 22 formed from the coating on the core. The second particles 23 can be embedded in the nanomatrix 22.

As used herein "substantially-continuous" describes the extension of the nanomatrix material throughout the article such that it extends between and envelopes substantially all of the dispersed particles formed from the core of the coated particles. Substantially-continuous is used to indicate that complete continuity and regular order of the nanomatrix around each dispersed particle is not required.

In an exemplary embodiment, the thickness of nanomatrix is substantially uniform throughout the microstructure of the article and comprises about two times the thickness of the metallic coating of the coated particles. In another exemplary embodiment, the cellular network has a substantially uniform average thickness between dispersed particles of about 50 nm to about 5000 nm.

In the instance where the core is partially or completely melted, the coating and the melted core can form a discontinuous nanomatrix. Without wishing to be bound by theory, it is believed that although the core is completely or partially melted, because the heating and cooling occur in such a short period of time during an additive manufacturing process, the melted core does not form a homogeneous mixture with the coating. Rather, the core forms discrete grains upon cooling, wherein the coating forms a three dimensional network surrounding or confining the core material.

Figure 4:
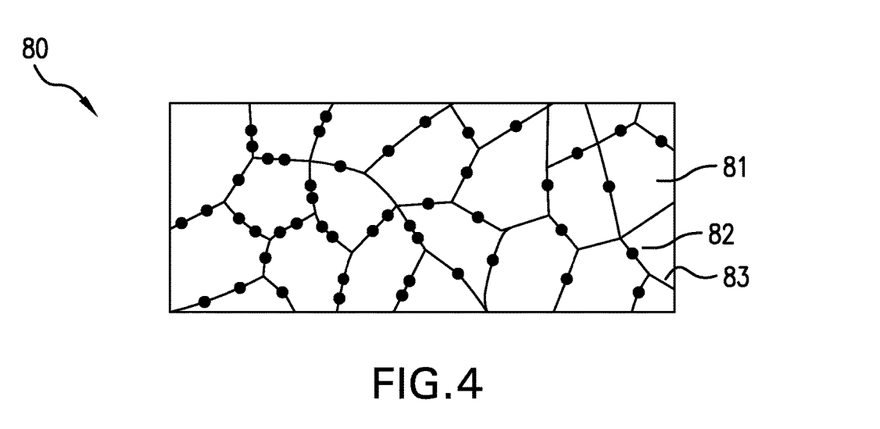
FIG. 4 is a schematic illustration of another exemplary embodiment of the microstructure of a portion of an article.

In the instance where the metallic powder comprises an uncoated metallic matrix particle and the second particle, the uncoated metallic matrix particle is completely or partially melted and the second particle is not melted, partially melted, or completely melted. Upon cooling, the metallic matrix particle forms a plurality of grains with the second particles disposed on the grain boundary. The microstructure of a portion of an article is illustrated in FIG. 4. As shown in FIG. 4, article 80 contains grains 81 formed from metallic matrix particles. The second particles 82 are disposed on the grain boundaries 83.

When the article has gradient properties, the method further comprises adjusting a composition of the metallic powder or a condition to fuse the metallic powder or a combination thereof such that the article has a first portion and a second portion, wherein the first portion has one or more of the following properties different than those of the second portion: corrosion rate; tensile strength; hardness; compressive strength; or modulus.

Adjusting a composition of the metallic powder comprises changing the relative amounts of the coated or uncoated metallic matrix particle and the second particle. The relative amounts of the coated or uncoated metallic matrix particles and the second particles can be adjusted by using premixed powders having different weight ratios of these two components. Alternatively, the relative amounts of these two particles can be adjusted in situ using two dispensers, one for the coated or uncoated matrix particle and the other for the second particle. In an embodiment, adjusting a composition of the metallic powder comprises establishing a gradient in the weight ratio of the coated or uncoated particle to the second particle. The gradient can be established from a first layer deposited on the substrate or worktable toward a second layer away from the substrate or the worktable. The gradient can also be established within one layer. Depending on the specific articles to be manufactured, gradient can be established within the same layers as well as between different layers.

Alternatively or in addition, adjusting a composition of the metallic powder comprises varying a particle size of the coated or uncoated metallic matrix particle, varying a particle size of the second particle, or a combination thereof. Without wishing to be bound by theory, it is believed that the portion of the article made from particles having relatively smaller sizes will have a greater disintegration rate as compared to the portion of the article made from particles having relatively larger sizes.

Figure 7:
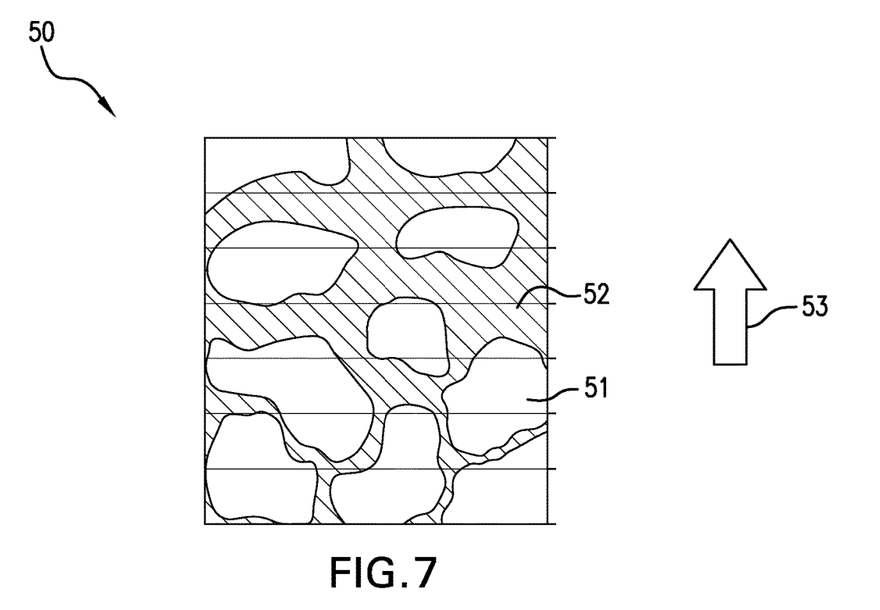
FIG. 7 is a cross-section of an article according to an embodiment of the disclosure wherein the article has a gradient mechanical or chemical property.

Adjusting a condition to fuse the plurality of layers comprises fusing the metallic powder at an energy gradient. The energy gradient is established continuously or in discrete steps. The change in energy applied to the metallic powder can be achieved by changing an intensity of an energy beam applied to a metallic powder, changing a speed of an energy beam to scan a metallic powder, or a combination thereof. In an embodiment, the energy gradient is established from a first layer deposited on a surface of the substrate or worktable toward a second layer away from the substrate or worktable. The gradient can also be established within one layer. Depending on the specific articles to be manufactured, gradient can be established within the same layers as well as between different layers. The microstructure of an article made at a gradient energy is illustrated in FIG. 7. As shown in FIG. 7, the article 50 contains discrete particles 51 and nanomatrix 52, wherein the degree of homogenization increases in the direction of 53. A change of the degree of homogenization leads to change of one or more of the following properties: corrosion rate; hardness; tensile strength; compressive strength; or compressive modulus.

The method further includes acquiring, generating and/or creating a design for the article. The design may be defined by the size and shape of the article, material density, fusing energy profile or composition profile of the metallic powder to achieve the gradient properties. For example, a design may be generated that features articles having a selected corrosion rate at one portion of the article and another different selected corrosion rate at another portion of the article.

Using the above processes, an article having controlled chemical and physical properties at different locations can be formed. The articles prepared according to the methods disclosed herein can have dual functions. In an embodiment, the article comprising a first portion that is corrodible in a fluid such as water; brine; or an acid, or a combination comprising at least one of the foregoing at a first corrosion rate and a second portion that is corrodible in the fluid at a second corrosion rate, wherein the first corrosion rate is greater than the second corrosion rate. The article can be used to perform a first operation. After exposing the article to the fluid, the first portion of the article is selectively corroded, i.e., completely or partially removed to provide a corroded article; which can be used to perform a second operation that is different from the wellbore operation. In an embodiment, the article is a downhole article, the fluid is a wellbore fluid, and the first and second operations are wellbore operations.

Figure 8:
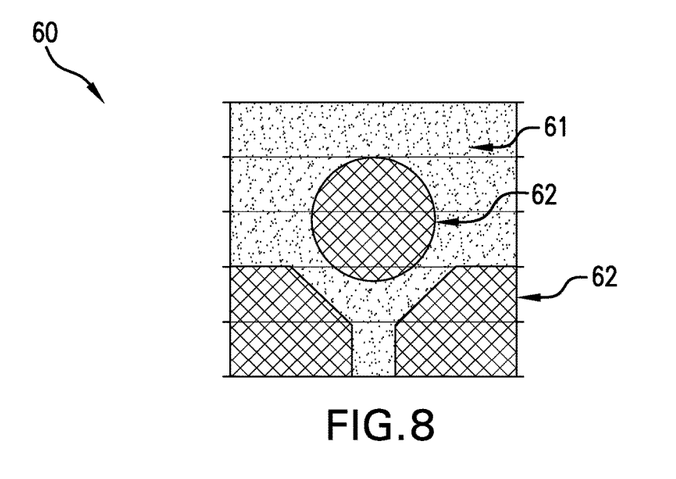
FIG. 8 is a cross-section of an embodiment of a downhole article that can be used for different wellbore operations.

An exemplary downhole article prepared from a method disclosed herein is shown in FIG. 8. The downhole article 60 has two portions, first portion 61 and second portion 62. The first portion 61 has a higher corrosion rate than the second portion 62. Article 60 can be used as plug or barrier initially. After the first portion 61 is dissolved by contacting with a downhole fluid, the remaining second portion 62 can be used as a check valve. Thus article 60 has dual functions.

The article can be a single component article. In an embodiment, the articles inhibit flow. In another embodiment, the articles are pumpable within a downhole environment. In still another embodiment, the articles are corrodible in a downhole environment.

Illustrative single component articles include flappers, hold down dogs and springs, screen protectors, seal bore protectors, electric submersible pump space out subs, full bore guns, chemical encapsulations, slips, dogs, springs and collet restraints, liner setting sleeves, timing actuation devices, emergency grapple release, chemical encapsulation containers, screen protectors, beaded screen protectors, whipstock lugs, whipstock coatings, pins, set screws, emergency release tools, gas generators, mandrels, release mechanisms, staging collars, C-rings, components of perforating gun systems, disintegrable whipstock for casing exit tools, shear pins, dissolvable body locking rings, mud motor stators, progressive cavity pump stators, and shear screws.

Illustrative articles that inhibit flow include seals, high pressure beaded frac screen plugs, screen basepipe plugs, coatings for balls and seats, compression packing elements, expandable packing elements, O-rings, bonded seals, bullet seals, sub-surface safety valve seals, sub-surface safety valve flapper seal, dynamic seals, V-rings, back up rings, drill bit seals, liner port plugs, atmospheric discs, atmospheric chamber discs, debris barriers, drill in stim liner plugs, inflow control device plugs, flappers, seats, ball seats, direct connect disks, drill-in linear disks, gas lift valve plug, fluid loss control flappers, electric submersible pump seals, shear out plugs, flapper valves, gaslift valves, and sleeves.

Illustrative articles that are pumpable include plugs, direct connect plugs, bridge plugs, wiper plugs, frac plugs, components of frac plugs, drill in sand control beaded screen plugs, inflow control device plugs, polymeric plugs, disappearing wiper plugs, cementing plugs, balls, diverter balls, shifting and setting balls, swabbing element protectors, buoyant recorders, pumpable collets, float shoes, and darts.

The article can be a downhole article. In a specific embodiment, articles include, for example a ball, a ball seat, a fracture plug, or other such downhole article.

Advantageously, additive manufacturing processes can be used to manufacture articles having a seamless structure encompassing an empty space. In an embodiment, the article is disintegrable and comprises a plurality of micro-sized or nano-sized galvanic cells. Each of the micro-sized or nano-sized galvanic cells comprises an anode and a cathode, the anode comprising one or more of the following: Mg; Al; Zn; Mn, or an alloy thereof; and the cathode comprising a metal; an oxide of the metal; a nitride of the metal; or a cermet of the metal; wherein the metal is one or more of the following: W; Co; Cu; Ni; or Fe.

The seamless article can be made from a metallic powder, which is the same as described herein for the metallic powder used to manufacturing articles having gradient properties.

The seamless article can have a uniform corrosion rate or a gradient corrosion rate. In an embodiment, the seamless article has a corrosion rate of about 0.1 to about 450 mg/cm$^2$/hour using an aqueous 3 wt. % KCl solution at 200° F. When the seamless article has a uniform corrosion rate, the method comprises depositing a metallic powder on a substrate or a worktable; and fusing the metallic powder according to a preset pattern to additively form the article. When the seamless article has a gradient corrosion rate, the method further comprises adjusting a composition of the metallic powder or a condition to fuse the metallic powder or a combination thereof.

The seamless article can be any of the articles disclosed herein. Specific illustrative examples include hollow plugs such as frac plugs, hollow balls, and hollow ball seats.

Figure 9:
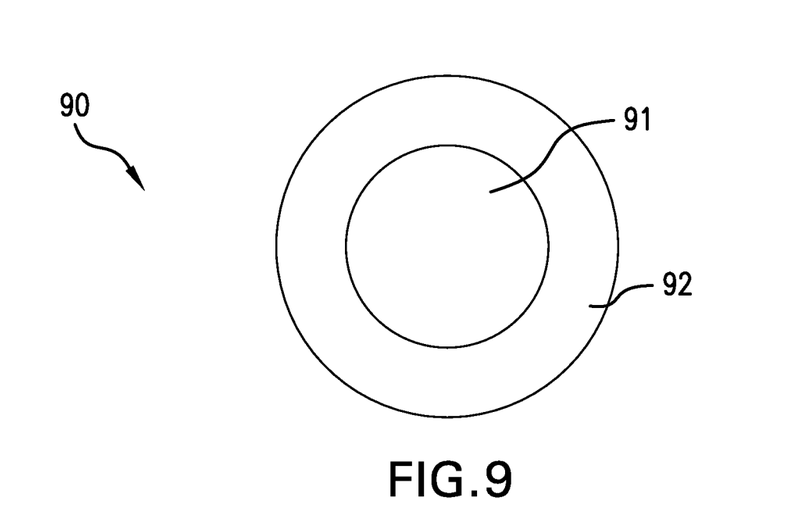
FIG. 9 is a cross-section of an embodiment of an article having a seamless structure encompassing an empty space.
Figure 10:
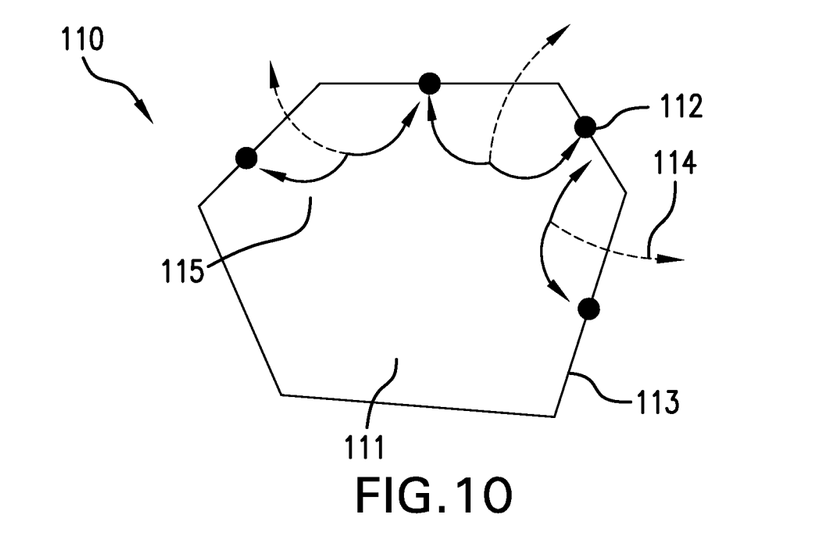
FIG. 10 illustrates the flow direction of electrons in galvanic cells of an article when the article is disintegrated.

FIG. 9 shows an exemplary embodiment of a hollow ball 90. The ball includes an empty space 91 encompassed by a seamless wall 92. Ball 90 contains a plurality of nano-sized or micro-sized galvanic cells 110, which are illustrated in FIG. 10. As shown in FIG. 10, because the metallic matrix material 111 is more reactive than the second particles 112 disposed on grain boundaries 113, the matrix material loses electrons and forms a cation. The electrons move from the metallic matrix material to the second particles along directions 115. The cations formed from the matrix material dissolve in the electrolyte shown as 114 in FIG. 10. The presence of multiple micron-sized or nano-sized galvanic cells ensures that the reaction is conducted in a controllable manner.

Further included in this disclosure are the following specific embodiments, which do not necessarily limit the claims.

Embodiment 1

A method of manufacturing an article, the method comprising:
depositing a metallic powder on a substrate or a worktable;
fusing the metallic powder according to a preset pattern; and
adjusting a composition of the metallic powder or a condition to fuse the metallic powder or a combination thereof to additively form an article such that the article has a first portion and a second portion, wherein the first portion has one or more of the following properties different than those of the second portion: corrosion rate; tensile strength; compressive strength; modulus; or hardness.

Embodiment 2

The method of embodiment 1, wherein the depositing and the fusing are carried out as part of a selective laser sintering process, a laser melting process, or a direct metal deposition process.

Embodiment 3

The method of embodiment 1 or embodiment 2, wherein fusing the metallic powder comprises applying an energy beam from an energy source to the metallic powder.

Embodiment 4

The method of any one of embodiments 1 to 3, wherein the metallic powder is at least partially fused before deposited on the substrate or the worktable.

Embodiment 5

The method of any one of embodiments 1 to 3, wherein the metallic powder is fused after deposited on the substrate or the worktable.

Embodiment 6

The method of any one of embodiments 1 to 5, wherein the metallic powder comprises an uncoated metallic matrix particle and a second particle;
the metallic matrix particle comprising one or more of the following: a magnesium-based alloy; an aluminum-based alloy; or a zinc-based alloy; and
the second particle comprising one or more of the following: a metal; an oxide of the metal; a nitride of the metal; or a cermet of the metal; wherein the metal is W; Co; Cu; Ni; or Fe.

Embodiment 7

The method of embodiment 6, wherein adjusting a composition of the metallic powder comprises changing the relative amounts of the metallic matrix particle and the second particle.

Embodiment 8

The method of embodiment 7, wherein adjusting a composition of the metallic powder comprises establishing a gradient in the weight ratio of the metallic matrix particle to the second particle.

Embodiment 9

The method of any one or more of embodiments 6 to 8, wherein adjusting a composition of the metallic powder comprises varying a particle size of the metallic matrix particle, varying a particle size of the second particle, or a combination thereof.

Embodiment 10

The method of any one of embodiments 1 to 5, wherein the metallic powder comprises a coated particle and optionally a second particle that is compositionally different from the coated particle; the coated particle having a particle core with a nanoscale coating disposed thereon, wherein the nanoscale coating has a melting point different than a melting point of the particle core.

Embodiment 11

The method of embodiment 10, wherein the particle core comprises one or more of the following: Mg; Al; Zn; Mn; or an alloy thereof.

Embodiment 12

The method of embodiment 10 or embodiment 11, wherein the nanoscale coating comprising one or more of the following: Al; Zn; Mn; Mg; Mo; W; Cu; Fe; Si; Ca; Co; Ta; Re; or Ni; an oxide thereof; a carbide thereof; or a nitride thereof.

Embodiment 13

The method of any one of embodiments 10 to 12, wherein the second particle comprises one or more of the following: Fe; Ni; Co; W; or Cu; or oxides; nitrides; or carbides thereof.

Embodiment 14

The method of any one of embodiments 10 to 13, wherein adjusting a composition of the metallic powder comprises changing the relative amounts of the coated particle and the second particle.

Embodiment 15

The method of any one of embodiments 10 to 14, wherein adjusting a composition of the metallic powder comprises establishing a gradient in the weight ratio of the coated particle to the second particle.

Embodiment 16

The method of any one or more of embodiments 10 to 15, wherein adjusting a composition of the metallic powder comprises varying a particle size of the coated metallic matrix particle, varying a particle size of the second particle, or a combination thereof.

Embodiment 17

The method of any one of embodiments 10 to 16, wherein fusing the deposited layers comprises applying an energy beam from an energy source to the metallic powder such that the metallic coating forms a cellular nanomatrix and the particle core forms discrete particles distributed in the cellular nanomatrix.

Embodiment 18

The method of any one of embodiments 1 to 17, wherein adjusting a condition to fuse the metallic powder comprises fusing the metallic powder at an energy gradient.

Embodiment 19

The method of embodiment 18, wherein the energy gradient is established continuously.

Embodiment 20

The method of embodiment 18, wherein the energy gradient is established in discrete steps.

Embodiment 21

The method of embodiment 18, wherein the energy gradient is established by changing an intensity of an energy beam applied to the metallic powder, changing a speed of an energy beam to scan the metallic powder, or a combination thereof.

Embodiment 22

The method of any one of embodiments 1 to 21, wherein the article is a downhole article.

Embodiment 23

The method of any one of embodiments 1 to 22, wherein the article has a seamless structure encompassing a closed empty space.

Embodiment 24

A method of using an article, the method comprising:
forming an article according to a method of any one of embodiments 1 to 23, the article comprising a first portion that is corrodible in a fluid at a first corrosion rate and a second portion that is corrodible in the fluid at a second corrosion rate, wherein the first corrosion rate is greater than the second corrosion rate;
using the article to perform a first operation;
exposing the article to the fluid;
selectively corroding the first portion of the article to provide a corroded article; and
using the corroded article to perform a second operation that is different from the first operation.

Embodiment 25

The method of embodiment 24, wherein exposing the article to the fluid comprises exposing the article to one or more of the following: water; brine; or an acid.

Embodiment 26

The method of embodiment 24 or embodiment 25, wherein selectively corroding comprises completely corroding the first portion of the article.

Embodiment 27

The method of embodiment 24 or embodiment 25, wherein selectively corroding comprises partially corroding the first portion of the article.

Embodiment 28

The method of any one of embodiments 24 to 27, wherein the article is a downhole article, the fluid is a wellbore fluid, and the first and second operations are wellbore operations.

Embodiment 29

An article manufactured by the method of any one of embodiments 1 to 23, wherein the article has a seamless structure encompassing an empty space.

Embodiment 30

An article comprising a plurality of micro-sized or nano-sized galvanic cells, wherein the article has a seamless structure encompassing an empty space.

Embodiment 31

The article of embodiment 30, wherein each of the micro-sized or nano-sized galvanic cells comprises an anode and a cathode,
the anode comprising one or more of the following: a magnesium-based alloy; an aluminum-based alloy; a zinc-based alloy; or a manganese-based alloy; and
the cathode comprising a metal; an oxide of the metal; a nitride of the metal; or a cermet of the metal; wherein the metal is one or more of the following: W; Co; Cu; Ni; or Fe.

Embodiment 32

The article of embodiments 30 or embodiment 31, wherein the article inhibits flow; and the article comprises a seal, a high pressure beaded frac screen plug, a screen basepipe plug, a compression packing element, an expandable packing element, an O-ring, a bonded seal, a bullet seal, a sub-surface safety valve seal, a sub-surface safety valve flapper seal, a dynamic seal, a V-ring, a back-up ring, a drill bit seal, a liner port plug, an atmospheric disc, an atmospheric chamber disc, a debris barrier, a drill in stim liner plug, an inflow control device plug, a flapper, a seat, a ball seat, a direct connect disk, a drill-in linear disk, a gas lift valve plug, a fluid loss control flapper, an electric submersible pump seal, a shear out plug, a flapper valve, a gaslift valve, or a sleeve.

Embodiment 33

The article of embodiment 30 or embodiment 31, wherein the article is pumpable within a downhole environment; and wherein article comprises a plug, a direct connect plug, a bridge plug, a wiper plug, a frac plug, a component of frac plug, a drill in sand control beaded screen plug, an inflow control device plug, a polymeric plug, a disappearing wiper plug, a cementing plug, a ball, a diverter ball, a shifting and setting ball, a swabbing element protector, a buoyant recorder, a pumpable collet, a float shoe, or a dart.

Embodiment 34

The article of embodiment 30, wherein the article is a hollow frac plug, a hollow ball, or a hollow ball seat.

Embodiment 35

The article of any one of embodiments 30 to 34, wherein the article has a gradient corrosion rate.

All ranges disclosed herein are inclusive of the endpoints, and the endpoints are independently combinable with each other. As used herein, "combination" is inclusive of blends, mixtures, alloys, reaction products, and the like. All references are incorporated herein by reference.

The use of the terms "a" and "an" and "the" and similar referents in the context of describing the invention (especially in the context of the following claims) are to be construed to cover both the singular and the plural, unless otherwise indicated herein or clearly contradicted by context. "Or" means "and/or." Further, it should further be noted that the terms "first," "second," and the like herein do not denote any order, quantity (such that more than one, two, or more than two of an element can be present), or importance, but rather are used to distinguish one element from another. The modifier "about" used in connection with a quantity is inclusive of the stated value and has the meaning dictated by the context (e.g., it includes the degree of error associated with measurement of the particular quantity). Unless defined otherwise, technical and scientific terms used herein have the same meaning as is commonly understood by one of skill in the art to which this invention belongs. As used herein, the size or average size of the particles refers to the largest dimension of the particles and can be determined by high resolution electron or atomic force microscope technology. The term "disintegration rate" is used interchangeably with "corrosion rate."

All references cited herein are incorporated by reference in their entirety. While typical embodiments have been set forth for the purpose of illustration, the foregoing descriptions should not be deemed to be a limitation on the scope herein. Accordingly, various modifications, adaptations, and alternatives can occur to one skilled in the art without departing from the spirit and scope herein.

What is claimed is:

1. A method of manufacturing an article, the method comprising:
    depositing a metallic powder on a substrate or a worktable;
    fusing the metallic powder according to a preset pattern; and
    adjusting a composition of the metallic powder or a condition to fuse the metallic powder or a combination thereof to additively form an article such that the article has a first portion and a second portion, wherein the first portion has one or more of the following properties different than those of the second portion: corrosion rate; tensile strength; compressive strength; modulus; or hardness,
    wherein the metallic powder comprises a coated particle having a particle core with a nanoscale coating disposed thereon, the nanoscale coating having a melting point different than a melting point of the particle core.

2. The method of claim 1, wherein the depositing and the fusing are carried out as part of a selective laser sintering process, a laser melting process, or a direct metal deposition process.

3. The method of claim 1, wherein fusing the metallic powder comprises applying an energy beam from an energy source to the metallic powder.

4. The method of claim 1, wherein the metallic powder is at least partially fused before deposited on the substrate or the worktable.

5. The method of claim 1, wherein the metallic powder is fused after deposited on the substrate or the worktable.

6. The method of claim 1, wherein the particle core comprises one or more of the following: Mg; Al; Zn; Mn; or an alloy thereof.

7. The method of claim 1, wherein the nanoscale coating comprises one or more of the following: Al; Zn; Mn; Mg; Mo; W; Cu; Fe; Si; Ca; Co; Ta; Re; or Ni; an oxide thereof; a carbide thereof; or a nitride thereof.

8. The method of claim 1, wherein adjusting a condition to fuse the metallic powder comprises fusing the metallic powder at an energy gradient.

9. The method of claim 1, wherein the metallic powder further comprises a second particle that is compositionally different from the coated particle.

10. The method of claim 9, wherein the second particle comprises one or more of the following: Fe; Ni; Co; W; or Cu; or oxides; nitrides; or carbides thereof.

11. The method of claim 9, wherein adjusting a composition of the metallic powder comprises changing the relative amounts of the coated particle and the second particle.

12. The method of claim 9, wherein adjusting a composition of the metallic powder comprises varying a particle size of the metallic matrix particle, varying a particle size of the second particle, or a combination thereof.

13. A method of using an article, the method comprising:
    forming an article according to a method of claim 1, the article comprising a first portion that is corrodible in a fluid at a first corrosion rate and a second portion that is corrodible in the fluid at a second corrosion rate, wherein the first corrosion rate is greater than the second corrosion rate;
    using the article to perform a first operation;
    exposing the article to the fluid;
    selectively corroding the first portion of the article to provide a corroded article; and
    using the corroded article to perform a second operation that is different from the first operation.

14. The method of claim 13, wherein the article is a downhole article, the fluid is a wellbore fluid, and the first and second operations are wellbore operations.

15. A method of manufacturing an article, the method comprising:
    depositing a metallic powder on a substrate or a worktable;

fusing the metallic powder according to a preset pattern; and adjusting a composition of the metallic powder or a condition to fuse the metallic powder or a combination thereof to additively form an article such that the article has a first portion and a second portion, wherein the first portion has one or more of the following properties different than those of the second portion: corrosion rate; tensile strength; compressive strength; modulus; or hardness;

wherein the metallic powder comprises an uncoated metallic matrix particle and a second particle;

the metallic matrix particle comprising one or more of the following: a magnesium-based alloy; an aluminum-based alloy; or a zinc-based alloy; and the second particle comprising one or more of the following: a metal; an oxide of the metal; a nitride of the metal; or a cermet of the metal; wherein the metal is W; Co; Cu; Ni; or Fe.

16. The method of claim 15, wherein adjusting a composition of the metallic powder comprises changing the relative amounts of the metallic matrix particle and the second particle.

17. The method of claim 16, wherein adjusting a composition of the metallic powder comprises varying a particle size of the metallic matrix particle, varying a particle size of the second particle, or a combination thereof.

18. The method of claim 15, wherein the metallic matrix particle comprises a magnesium-based alloy.

19. The method of claim 15, wherein the metallic matrix particle comprises a zinc-based alloy.

* * * * *